(12) United States Patent
Rho et al.

(10) Patent No.: US 7,733,451 B2
(45) Date of Patent: Jun. 8, 2010

(54) LIQUID CRYSTAL DISPLAY, METHOD OF MANUFACTURING THE SAME, AND APPARATUS MANUFACTURING THE SAME

(75) Inventors: Soon-Joon Rho, Suwon-si (KR); Duck-Jong Suh, Seoul (KR); Yong-Kuk Yun, Suwon-si (KR); Baek-Kyun Jeon, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 877 days.

(21) Appl. No.: 11/485,831

(22) Filed: Jul. 12, 2006

(65) Prior Publication Data
US 2007/0013846 A1    Jan. 18, 2007

(30) Foreign Application Priority Data
Jul. 12, 2005    (KR) .................. 10-2005-0062737

(51) Int. Cl.
*G02F 1/1337*    (2006.01)
*G02F 1/13*    (2006.01)

(52) U.S. Cl. ...................... 349/124; 349/187
(58) Field of Classification Search ............ 349/124, 349/187–192
See application file for complete search history.

(56) References Cited

U.S. PATENT DOCUMENTS 6,849,858 B2    2/2005    Okazaki et al.

7,368,331 B2 *    5/2008    Hirai .................. 438/149
2005/0062921 A1    3/2005    Gao et al.

FOREIGN PATENT DOCUMENTS

| CN | 1398305 | 2/2003 |
|----|---------|--------|
| CN | 1398305 A | 2/2003 |
| CN | 1405580 | 3/2003 |
| CN | 1591134 | 3/2005 |
| CN | 1538225 | 10/2007 |
| JP | 6-289401 | 10/1994 |
| JP | 9-230351 | 9/1997 |
| JP | 2004-318151 | 11/2004 |
| JP | 2004-341542 | 12/2004 |
| JP | 2004-341542 A | 12/2004 |
| KR | 2003-0018084 | 3/2003 |

(Continued)

OTHER PUBLICATIONS

Patent Abstracts of Japan, Publication No. 06-289401, Oct. 18, 1994, 2 pp.

(Continued)

*Primary Examiner*—Kevin S Wood
(74) *Attorney, Agent, or Firm*—Innovation Counsel LLP

(57) ABSTRACT

A liquid crystal display, a method for manufacturing the same, and an apparatus for manufacturing the same are provided. A method includes forming a field-generating electrode on a panel, and forming an inorganic alignment layer on the substrate by using atmospheric pressure plasma. The process using the atmospheric pressure plasma to form the inorganic alignment layer is more simplified by omitting the etch steps of the short point area and the pad areas. Also, alignment layers may be formed on the mother glass with various shapes by using one apparatus.

15 Claims, 11 Drawing Sheets

FOREIGN PATENT DOCUMENTS

| | | |
|---|---|---|
| KR | 2005-0022265 | 3/2005 |
| KR | 2005-0024247 | 3/2005 |
| KR | 2005-0029354 | 3/2005 |

OTHER PUBLICATIONS

Patent Abstracts of Japan, Publication No. 09-230251, Sep. 5, 1997, 1 p.

Patent Abstracts of Japan, Publication No. 2004-318151, Nov. 11, 2004, 2 pp.

Korean Patent Abstracts, Publication No. 1020030018084, Mar. 6, 2003, 1 p.

Korean Patent Abstracts, Publication No. 1020050022265, Mar. 7, 2005, 2 pp.

Korean Patent Abstracts, Publication No. 1020050024247, Mar. 10, 2005, 2 pp.

Korean Patent Abstracts, Publication No. 1020050029354, Mar. 28, 2005, 2 pp.

* cited by examiner

LIQUID CRYSTAL DISPLAY, METHOD OF MANUFACTURING THE SAME, AND APPARATUS MANUFACTURING THE SAME

The present application claims priority from Korean Patent Application No. 10-2005-0062737, filed on Jul. 12, 2005, the disclosure of which is hereby incorporated herein by reference in its entirety.

BACKGROUND OF THE INVENTION (a) Field of the Invention

The present invention relates to a liquid crystal display, a method of manufacturing the same, and an apparatus for manufacturing the same.

(b) Description of the Related Art

Liquid crystal displays (LCDs) are one of the most widely used flat panel displays. An LCD includes two panels provided with field-generating electrodes and a liquid crystal (LC) layer interposed therebetween. The LCD displays images by applying voltages to field-generating electrodes to generate an electric field in the LC layer, which determines orientations of LC molecules in the LC layer to adjust polarization of incident light.

Among LCDs that include field-generating electrodes on respective panels, a plurality of pixel electrodes arranged in a matrix are provided on one panel and a common electrode is provided covering an entire surface of the other panel. Image display of the LCD is accomplished by applying individual voltages to the respective pixel electrodes. For the application of the individual voltages, a plurality of three-terminal thin film transistors (TFTs) are connected to the respective pixel electrodes, and a plurality of gate lines transmitting signals for controlling the TFTs and a plurality of data lines transmitting voltages to be applied to the pixel electrodes are provided on the panel.

The LCD also includes at least one alignment layer for aligning the liquid crystal molecules of the liquid crystal layer in horizontal or vertical alignments from the surfaces of the panels. The alignment layer is an organic alignment layer made of a polyimide material that is printed on the panels.

However, it is difficult for the alignment layer to be printed on the panel with a uniform thickness with a large-scale panel, and alignment defects are frequently generated due to a low polyimidization ratio of the alignment layer. Also, multiple processes such as the printing of polyimide, a pre-cure, and a main-cure are required to form the organic alignment layer.

Accordingly, a technique for replacing the organic alignment layer with an inorganic alignment layer has been developed, and the inorganic alignment layer may be more easily formed than the organic alignment layer. However, expensive devices for thin film deposition process such as plasma enhanced chemical vapor deposition and sputtering are required to form the inorganic alignment layer. Also, when these devices are used, a step process for removing the deposited alignment layer to expose a short point area and a pad area for electrical connection of the upper and the lower panels and external driving circuits are required.

SUMMARY OF THE INVENTION

It is an object of the present invention to provide a liquid crystal display, a method of manufacturing the same, and an apparatus for manufacturing the same for forming an inorganic alignment layer with a low cost by omitting the etch process to expose a short point area and a pad area.

In accordance with an embodiment of the present invention, a method for manufacturing a liquid crystal display is provided, which includes forming a field-generating electrode on a panel, and forming an inorganic alignment layer on the substrate using atmospheric pressure plasma.

It is preferable that the inorganic alignment layer is only formed on the active area of the panel, and that plasma-generating electrodes are moved on the panel to form the inorganic alignment layer.

The method may further include pre-cleaning a portion of the panel before depositing the inorganic alignment layer using atmospheric pressure plasma.

The method may further include post-cleaning the surface of the inorganic alignment layer by using atmospheric pressure plasma after forming the inorganic alignment layer.

It is preferable that the pre-cleansing and the post-cleansing processes use at least one gas selected from oxygen ($O_2$), helium (He), and air, and that an ion beam treatment is executed on the surfaces of the inorganic alignment layers after forming the inorganic alignment layer.

The inorganic alignment layer may include at least one material selected from amorphous silicon (a-Si), silicon carbide (SiC), silicon nitride (SiN), silicon oxide ($SiO_X$), and fluorinated diamond-like carbon.

Silane ($SiH_4$), hydrogen ($H_2$), or helium (He) may be used to form the amorphous silicon (a-Si).

Silane ($SiH_4$), methane ($CH_4$), hydrogen ($H_2$), or helium (He) may be used to form silicon carbide (SiC).

Silane ($SiH_4$), ammonia ($NH_3$), hydrogen ($H_2$), or helium (He) may be used to form the silicon nitride (SiN).

Silane ($SiH_4$), oxygen ($O_2$), or helium (He) may be used to form the silicon oxide ($SiO_X$).

Acetylene ($C_2H_2$), a fluorine-containing gas such as carbon tetrafluoride ($CF_4$) and sulfur hexafluoride ($SF_6$), or helium (He) may be used to form the fluorinated diamond-like carbon.

In accordance with another embodiment of the present invention, an apparatus for manufacturing a liquid crystal display is provided, which includes a first electrode; a plasma controller attached to the first electrode and having at least one small electrode and insulator, wherein the small electrode and the insulator are alternatively arranged; a second electrode facing the first electrode and formed on a mother glass including at least one active area; a power generator for generating a radio frequency to apply the voltage to the first and second electrodes; and a gas supply unit for supplying a gas necessary for forming an inorganic alignment layer.

The plasma controller may be positioned at other than the first electrode.

It is preferable that at least the length of one side of the small electrode is the same as the length of one side of the active areas, and at least the length of one side of the insulator is the same as the interval between the active areas.

In accordance with yet another embodiment of the present invention, a liquid crystal display is provided, which includes a panel; and an inorganic alignment layer formed on the panel and having a rounded surface at an edge of the alignment layer.

It is preferable that the inorganic alignment layer includes at least one material selected from amorphous silicon (a-Si), silicon carbide (SiC), silicon nitride (SiN), silicon oxide ($SiO_X$), and fluorinated diamond-like carbon.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

The above and other advantages of the present invention will become more apparent by describing preferred embodiments thereof in detail with reference to the accompanying drawings, in which.

Figure 1:
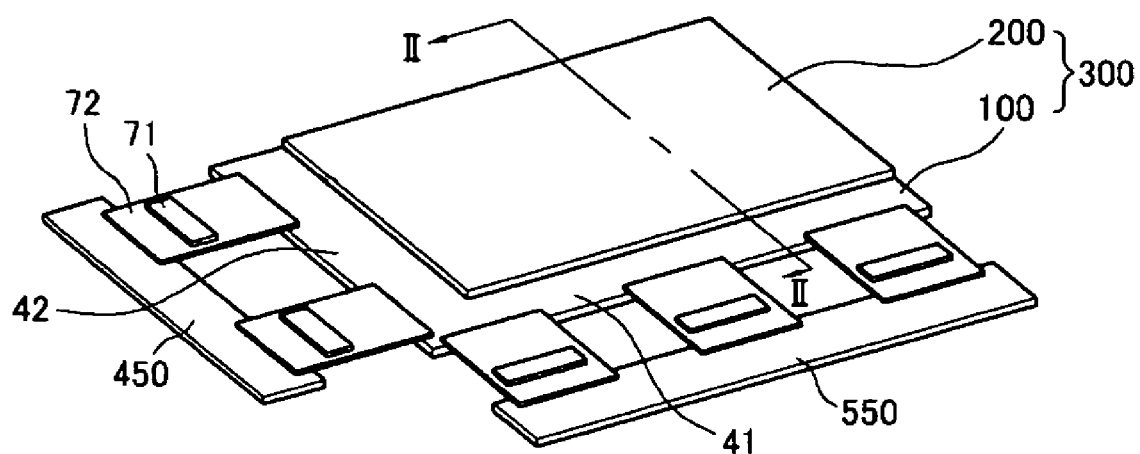
FIG. 1 is an exemplary perspective view of a liquid crystal display according to an embodiment of the present invention.

Embodiments of the present invention and their advantages are best understood by referring to the detailed description that follows. It should be appreciated that like reference numerals are used to identify like elements illustrated in one or more of the figures. It should also be appreciated that the figures may not be necessarily drawn to scale.

DETAILED DESCRIPTION OF EMBODIMENTS

The present invention will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present. In contrast, when an element is referred to as being "directly on" another element, there are no intervening elements present.

A liquid crystal display according to an embodiment of the present invention will be described in detail with reference to FIGS. 1 and 2.

Figure 2:
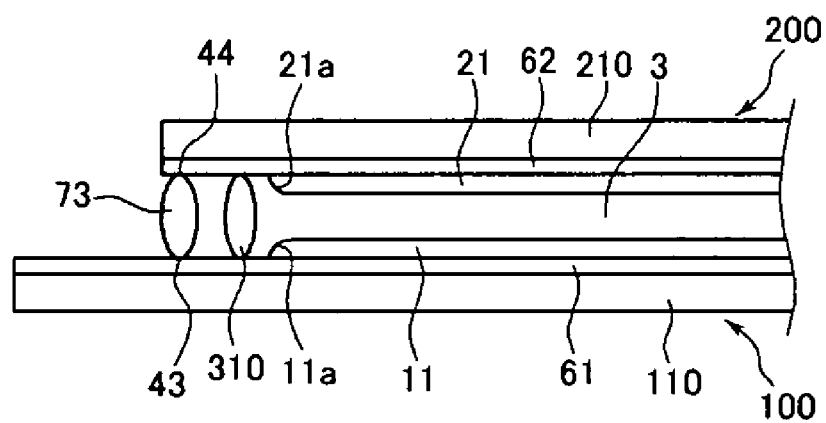
FIG. 2 is a sectional view of the LCD shown in FIG. 1 taken along the line II-II.

FIG. 1 is an exemplary perspective view of a liquid crystal display according to an embodiment of the present invention, and FIG. 2 is a sectional view of the LCD shown in FIG. 1 taken along the line II-II.

An LCD according to an embodiment of the present invention includes a liquid crystal panel assembly 300, a plurality of flexible printed circuit films 72 connected to the liquid crystal panel assembly 300, a plurality of drivers 71 formed on the flexible printed circuit films 72, and a plurality of printed circuit boards 450 and 550 connected to the flexible printed circuit films 72.

The liquid crystal panel assembly 300 includes a lower panel 100, an upper panel 200 opposite to the lower panel 100, an LC layer 3 having LC molecules that is disposed between the two panels 100 and 200, a sealant 310 enclosing the LC layer 3, and a short point 73 electrically connecting the lower and the upper panels 100 and 200.

Because the lower panel 100 is larger than the upper panel 200, peripheral areas 41 and 42 of the low panel 100 are exposed by the upper panel 200, and the flexible printed circuit films 72 are connected to the peripheral areas 41 and 42 of the lower panel 100.

The lower and upper panels 100 and 200, respectively, include substrates 110 and 210, and thin films 61 and 62 respectively formed on the substrates 110 and 210.

Alignment layers 11 and 21 are respectively formed on surfaces of the thin films 61 and 62, and the edges 11a and 21a of the alignment layers 11 and 21 are rounded.

The liquid crystal layer 3 is sealed by the sealant 310 between the lower and the upper panels 100 and 200.

The lower and the upper panels 100 and 200 respectively include conductive connecting members 43 and 44, and the short point 73 connects the lower panel 100 to the upper panel 200 via the conductive connecting members 43 and 44.

Now, a method for manufacturing the liquid crystal display according to an embodiment of the present invention will be described in more detail with reference to FIG. 3 as well as FIGS. 1 and 2.

Figure 3:
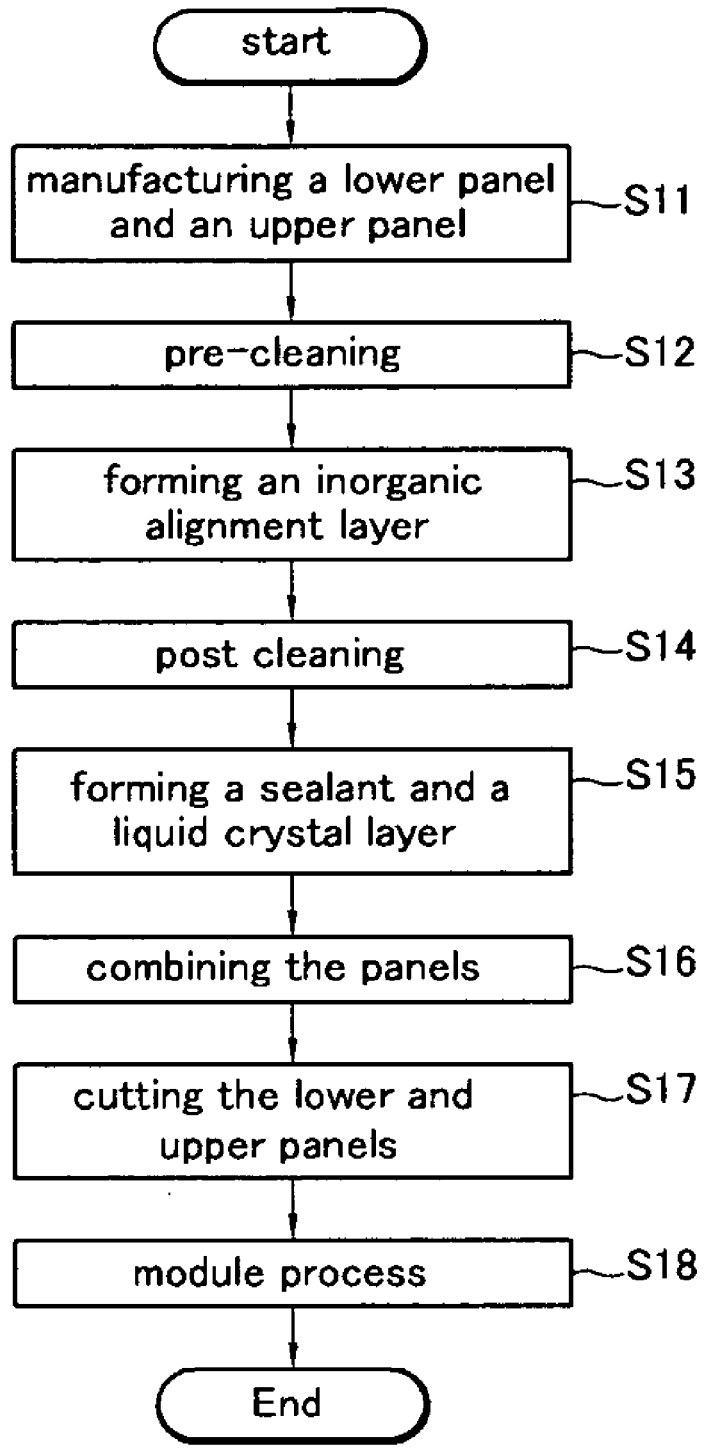
FIG. 3 is a flow chart showing a process of manufacturing the LCD according to an embodiment of the present invention.

FIG. 3 is a flow chart showing a process of manufacturing the LCD according to an embodiment of the present invention.

Referring to FIG. 3, the lower panel 100 is manufactured by forming the thin films 61 including thin film transistors (not shown), and pixel electrodes (not shown) on the substrate 110, and the upper panel 200 is manufactured by forming the thin films 62 including a common electrode and color filters on the substrate 210 (S11). Alternatively, the common electrode and color filters may be formed on the lower panel 100.

Next, the surfaces of the thin films 61 and 62 may be pre-cleaned by using atmospheric pressure plasma (S12) in accordance with the present invention. The pre-cleaning process using the atmospheric pressure plasma may use at least one gas selected from oxygen ($O_2$), helium (He), and air.

Next, inorganic alignment layers are respectively formed on the thin films 61 and 62 using atmospheric pressure plasma (S13) in accordance with the present invention. Here, the inorganic alignment layers are deposited in active areas where the thin film transistors and the pixel electrodes are disposed in the lower panel and where the color filters are disposed. The inorganic alignment layers may include at least one material selected from amorphous silicon (a-Si), silicon carbide (SiC), silicon nitride (SiN), silicon oxide ($SiO_x$), and fluorinated diamond-like carbon.

Gases such as silane ($SiH_4$), hydrogen ($H_2$), and helium (He) may be used to form the amorphous silicon (a-Si). Gases such as silane ($SiH_4$), methane ($CH_4$), hydrogen ($H_2$), and helium (He) may be used to form the silicon carbide (SiC). Gases such as silane ($SiH_4$), ammonia ($NH_3$), hydrogen ($H_2$), and helium (He) may be used to form the silicon nitride (SiN). Gases such as silane ($SiH_4$), oxygen ($O_2$), and helium (He) may be used to form the silicon oxide ($SiO_X$). Gases such as acetylene ($C_2H_2$), a fluorine-containing gas such as carbon tetrafluoride ($CF_4$) and sulfur hexafluoride ($SF_6$), and helium (He) may be used to form the fluorinated diamond-like carbon.

After forming the inorganic layers, ion beam treatment may be used in order to produce alignment characteristics on the surfaces of the inorganic layers.

Next, the surfaces of the alignment layers formed on the lower and upper panels are post-cleaned by using atmospheric pressure plasma (S14) in accordance with the present invention.

Next, the sealant 310 is formed, and a liquid crystal material is deposited on one of the lower and upper panels 100 and 200 (S15). Then, the upper and the lower panels 100 and 200 are combined (S16), and the combination divided into a plurality of display units (S17). A module process for connecting the unit panels to external driving circuits and a backlight unit is then undertaken to complete the liquid crystal panel assembly 300 (S18).

Now, an apparatus for manufacturing a liquid crystal display according to an embodiment of the present invention will be described in detail with reference to FIGS. 4 and 5.

Figure 4:
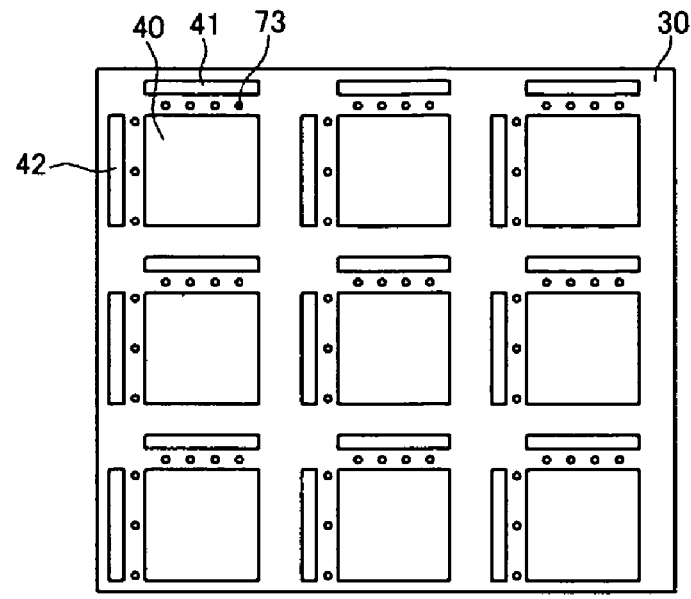
FIG. 4 is an exemplary plane view of a mother glass for a thin film transistor panel according to an embodiment of the present invention.
Figure 5:
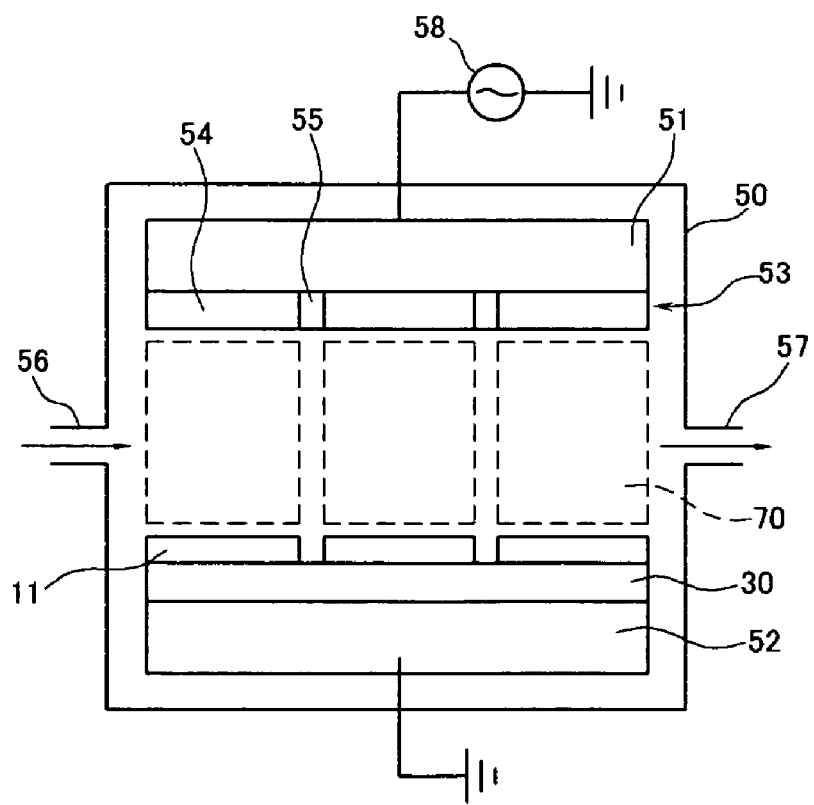
FIG. 5 is an exemplary section view of an apparatus for manufacturing a liquid crystal display according to an embodiment of the present invention.

FIG. 4 is a plane view of a mother glass for a thin film transistor panel according to an embodiment of the present invention, and FIG. 5 is a section view of an apparatus for manufacturing a liquid crystal display according to an embodiment of the present invention.

Referring to FIG. 4, a mother glass 30 includes a plurality of active areas 40, for example nine active areas in a 3×3 format. The active areas 40 are positions where a plurality of pixel electrodes and a plurality of thin film transistors are disposed. A plurality of data pad areas 41 and a plurality of gate pad areas 42 are disposed outside of the periphery portions of the active areas 40, which are arranged at two sides of the active areas 40. Each of the gate pad areas 42 is used to connect to a gate driving circuit for generating gate signals, and each of the data pad areas 41 is used to connect to a data driving circuit for generating data signals. A plurality of short points 73 are formed between the gate and the data pad areas 41 and 42, and the active areas 40, to electrically connect the upper panel 200 and the lower panel 100 to each other.

Referring to FIG. 5, an apparatus for forming the alignment layer includes a chamber 50 which receives the mother glass 30, and predetermined gases flows in and out thereof. The chamber 50 is an activation space for isolating the inner portion of the chamber 50 from the outside and forming the alignment layers by action of the predetermined gases.

The apparatus includes a first electrode 51 attached to an upper and interior portion of the chamber 50 and connected to an external power generator 58. The power generator 58 generates a radio frequency, and the first electrode 51 receives the radio frequency power from the power generator 58. It is preferable that the first electrode 51 is made of a conductive material such as aluminum, having lower resistance.

The apparatus includes a second electrode 52 attached to the lower inside part of the chamber 50 and facing the first electrode 51. The mother glass 30 is aligned with the second electrode 52 and the second electrode 52 is grounded.

A plasma controller 53 is attached to the surface of the first electrode 51 facing the second electrode 52. The plasma controller 53 includes a plurality of insulators 55 and a plurality of small electrodes 54, which are alternately and variably arranged.

The small electrodes 54 receive the radio frequency power from the first electrode 51 to form plasma 70 between the first electrode and the second electrode.

At least one side of the small electrode 54 is about the same length as at least that of the active areas 40. Accordingly, the inorganic alignment layer 11 may be deposited on the active areas 40 of the mother glass 30 by forming the plasma 70 only between the small electrode 54 and the second electrode 52.

Because the insulator 55 does not receive the radio frequency power from the first electrode 51, plasma is not formed between the insulator 55 and the second electrode 52. The length of at least one side of the insulator 55 is substantially the same as the intervals between the active areas 40. Accordingly, the inorganic alignment layer 11 is not formed on the places between the active areas 40

The chamber 50 has a gas supply unit 56 for supplying a gas necessary for forming the inorganic alignment layer 11 and a gas outlet unit 57 for exhausting the activation gas in the plasma state to outside the chamber 50.

Next, the step of forming an inorganic alignment layer in a manufacturing method using the apparatus shown in FIG. 5 according to an embodiment of the present invention will be described with reference to the drawings.

Figure 6A:
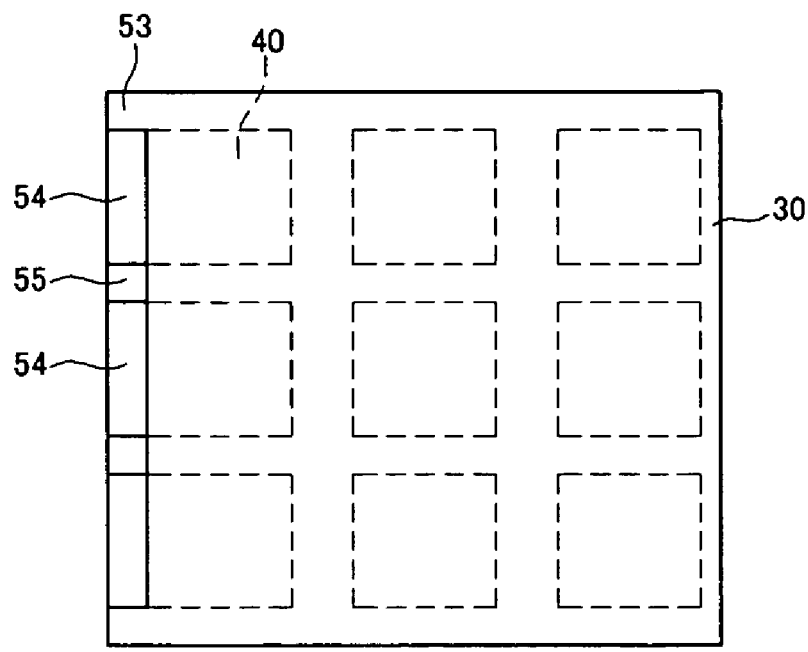
FIGS. 6A to 6C are plane views of a mother glass when forming an inorganic alignment layer in a manufacturing method using the apparatus shown in FIG. 5 according to an embodiment of the present invention.
Figure 6B:
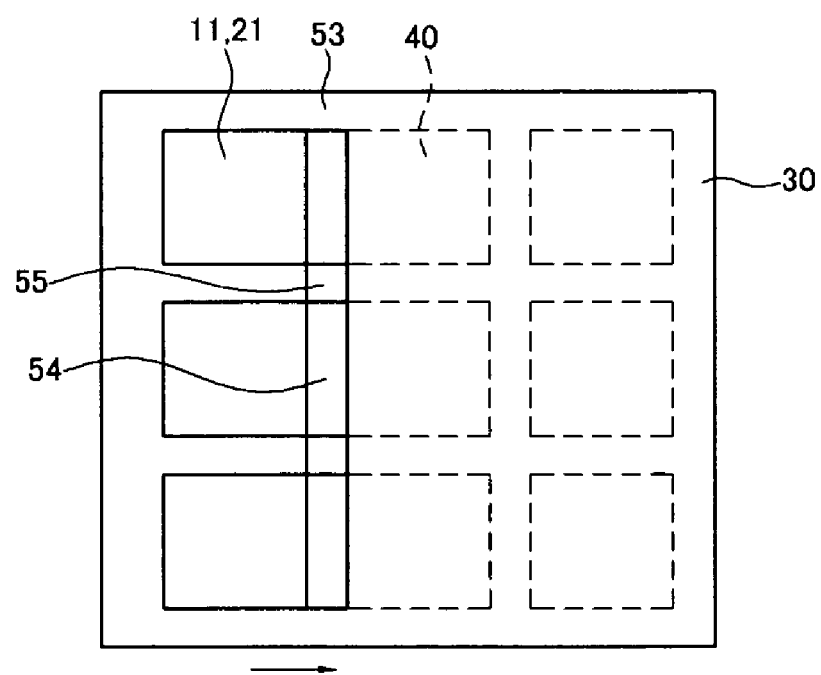
Figure 6C:
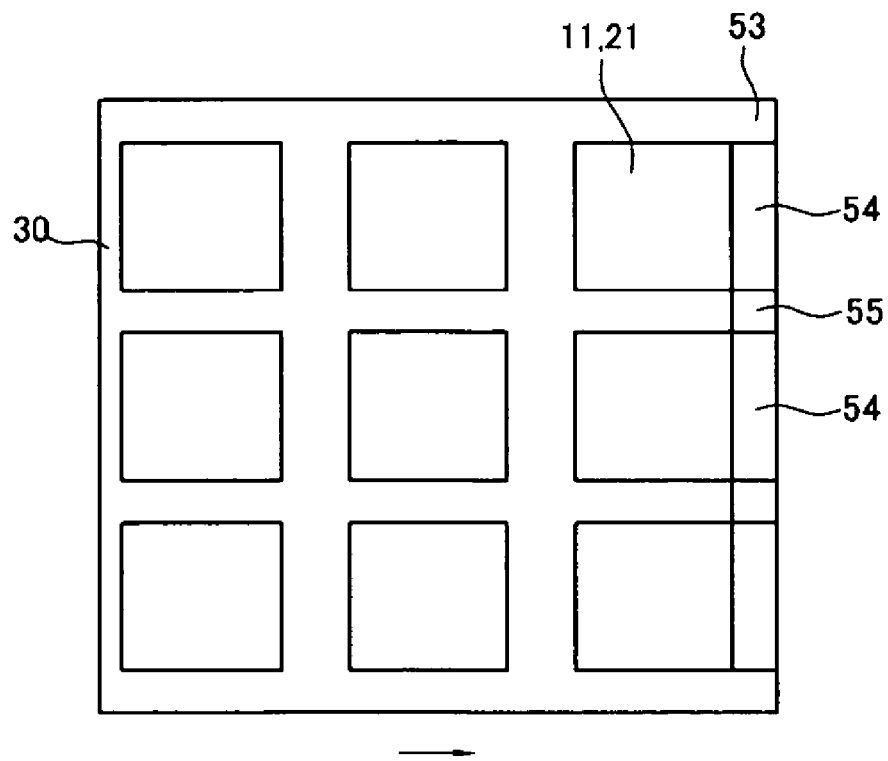

FIGS. 6A to 6C are plane views of a mother glass when forming an inorganic alignment layer in a manufacturing method using the apparatus shown in FIG. 5 according to an embodiment of the present invention.

Firstly, referring to FIG. 6A, the mother glass 30 is loaded on the second electrode 52, and the plasma controller 53 is aligned on one end portion of the mother glass 30. Then, the small electrodes 54 of the plasma controller 53 face the active areas 40 of the mother glass 30 and the insulators 55 face the spaces between the active areas 40.

Referring to FIG. 6B, the plasma controller 53 is moved to the other end portion of the mother glass 30. Then, the inorganic alignment layers 11 and 21 are deposited only on the active areas 40 by forming the plasma only between the small electrode 54 and the second electrode 52 when the plasma controller 53 is moving. When the plasma controller 53 arrives at the end position of one active area 40, the radio frequency power is stopped. Then, when the plasma controller 53 arrives at the start position of neighboring active areas 40, the radio frequency power is again supplied and the inorganic alignment layers 11 and 21 are again deposited.

After repeatedly executing these processes, when the plasma controller 53 arrives at the other end portion of the mother glass 30, the supply of the radio frequency power is stopped, and the inorganic alignment layers 11 and 21 are completely formed on the active areas 40 of the mother glass 30, as shown in FIG. 6C.

Advantageously, the inorganic alignment layers 11 and 21 are only formed on the active areas 40 by using atmospheric pressure plasma in the embodiment of the present invention, and the inorganic alignment layer is not deposited on the gate pad areas 42, the data pad areas 41, or short point areas 73. Accordingly, it is not necessary to etch the deposited alignment layer to expose the electric connection areas. Also, the apparatus using the atmospheric pressure plasma to form the inorganic alignment layer is more simplified, and the process time may be minimized by omitting a process to form a vacuum. Furthermore, as the plasma controller 53 moves the inorganic alignment layers are simultaneously deposited.

Accordingly, the inorganic alignment layers have a uniform thickness on the mother glass even though the mother glass may be of a large scale.

Next, an apparatus for manufacturing a liquid crystal display according to another embodiment of the present invention will be described in detail with reference to FIGS. 7 and 8.

Figure 7:
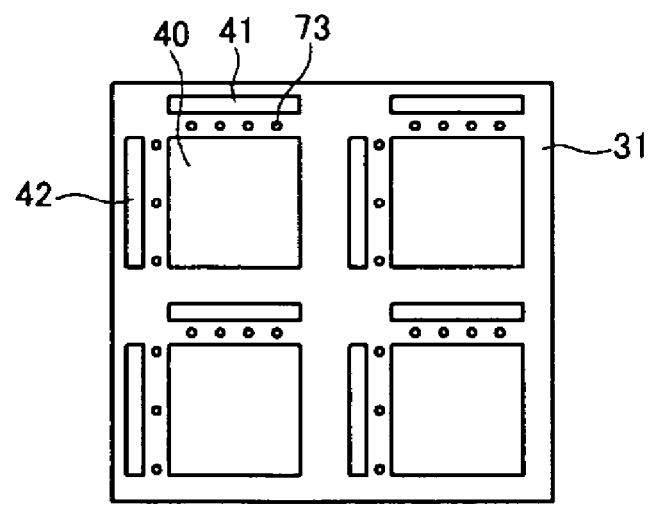
FIG. 7 is an exemplary plane view of a mother glass for a thin film transistor panel according to another embodiment of the present invention.
Figure 8:
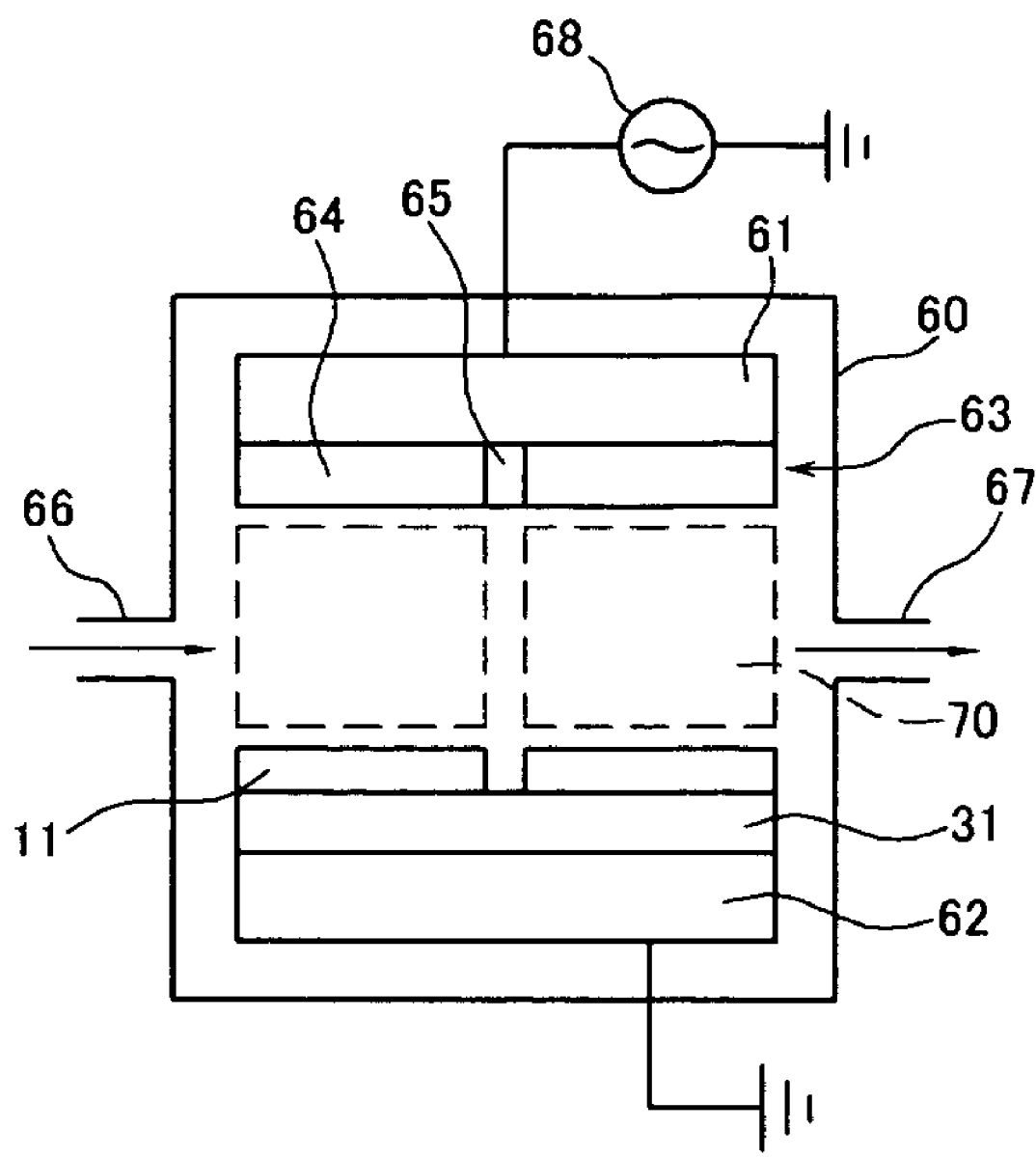
FIG. 8 is an exemplary section view of an apparatus for manufacturing a liquid crystal display according to another embodiment of the present invention.

FIG. 7 is a plane view of a mother glass for a thin film transistor panel according to another embodiment of the present invention, and FIG. 8 is a section view of an apparatus for manufacturing a liquid crystal display according to another embodiment of the present invention.

Referring to FIG. 7, a mother glass 31 includes a plurality of active areas 40, for example four active areas in a 2×2 format. A plurality of data pad areas 41 and a plurality of gate pad areas 42 are disposed out of the periphery portions of the active areas 40, which are arranged at the two sides of the active areas 40. A plurality of short points 73 are formed between the gate and the data pad areas 41 and 42, and the active areas 40.

Referring to FIG. 8, a plasma controller 63 attached to the surface of the first electrode 61 facing the second electrode 62 has an array structure of the active areas 40 of the mother glass 30. The plasma controller 63 includes two small electrodes 64 and an insulator 65 formed between the two small electrodes 64. At least one side of the small electrode 64 is about the same length as at least that of the active areas 40, and the length of at least one side of the insulator 65 is substantially the same as the intervals between the active areas 40.

Next, the step of forming an inorganic alignment layer in a manufacturing method using the apparatus shown in FIG. 8 according to the embodiment of the present invention will be described with reference to the drawings.

Figure 9A:
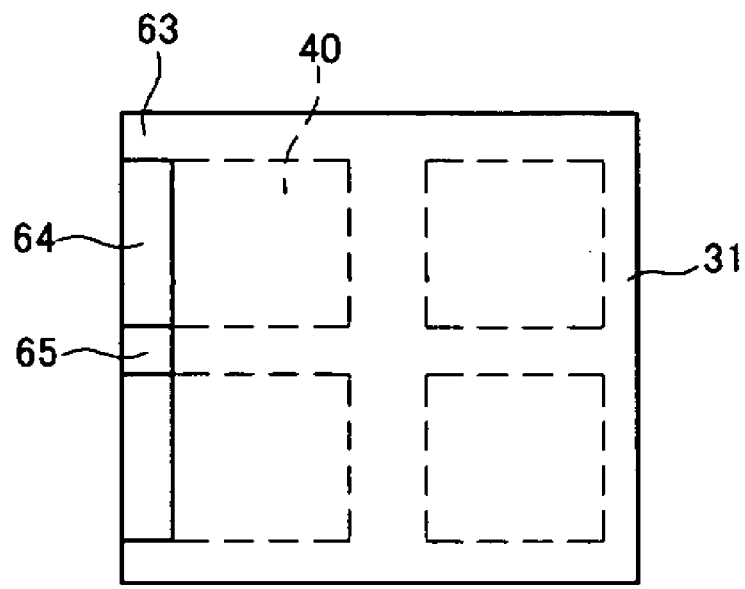
FIGS. 9A to 9C are plane views of a mother glass when forming an inorganic alignment layer in a manufacturing method using the apparatus shown in FIG. 8 according to another embodiment of the present invention.
Figure 9B:
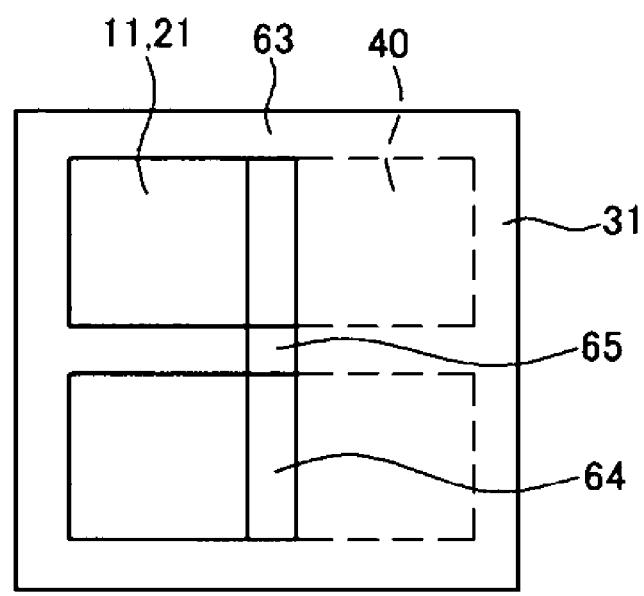
Figure 9C:
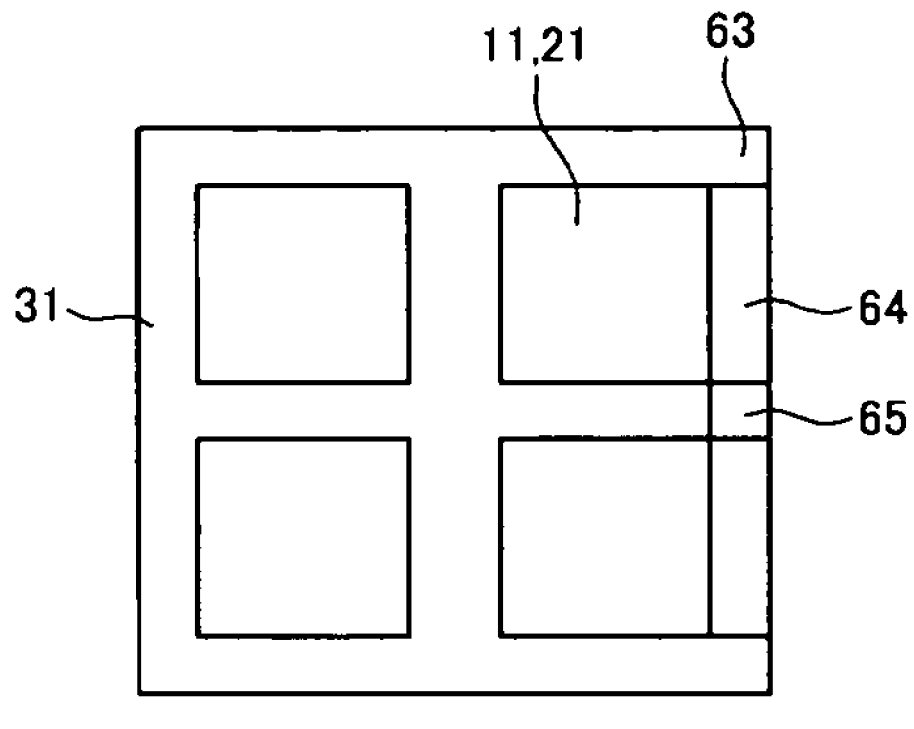

FIGS. 9A to 9C are plane views of a mother glass when forming an inorganic alignment layer in a manufacturing method using the apparatus shown in FIG. 8 according to an embodiment of the present invention.

Firstly, referring to FIG. 9A, the mother glass 31 is loaded with the second electrode 62, and the plasma controller 63 is aligned on one end portion of the mother glass 31. Then, the small electrodes 64 of the plasma controller 63 face the active areas 40 of the mother glass 31 and the insulators 65 face the spaces between the active areas 40.

Referring to FIG. 9B, the plasma controller 63 is moved to the other end portion of the mother glass 31. Then, the inorganic alignment layers 11 and 21 are deposited only on the active areas 40 by forming the plasma only between the small electrode 64 and the second electrode 62 as the plasma controller 63 moves. When the plasma controller 63 arrives at the end position of one active area 40, the radio frequency power is stopped. Then, when the plasma controller 63 arrives at the start position of neighboring active areas 40, the radio frequency power is again supplied and the inorganic alignment layers 11 and 21 are again deposited.

After repeatedly executing these processes, when the plasma controller 63 arrives at the other end portion of the mother glass 31, the supply of the radio frequency power is stopped, and the inorganic alignment layers 11 and 21 are completely formed on the active areas 40 of the mother glass 31, as shown in FIG. 9C.

Advantageously, the arrangement design of the insulators 55 and 65, and the small electrodes 54 and 64 of the plasma controllers 53 and 63, respectively, may be varied according to the size and the number of active areas 40 formed on the mother glass 30 and 31, respectively. Accordingly, the present invention allows for plasma controllers attached to an apparatus for providing atmospheric pressure plasma to form alignment layers on the active areas of a mother glass in various numbers and shapes by using one apparatus.

Now, the inorganic alignment layer formed on a mother glass is described in greater detail with reference to the drawings.

Figure 10:
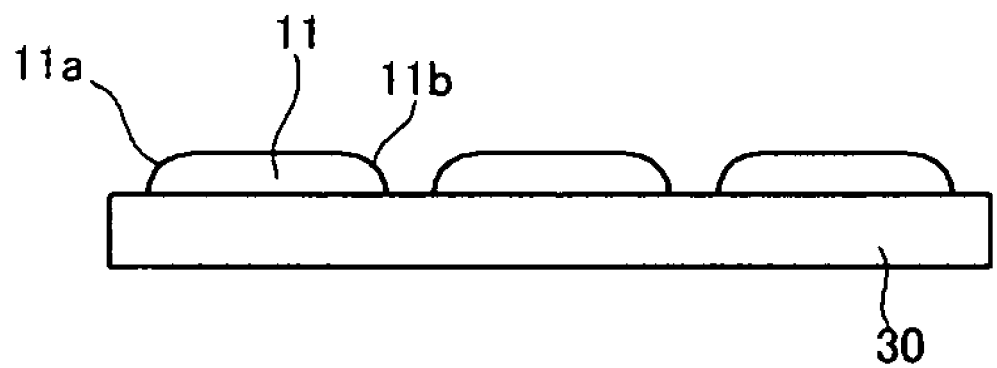
FIG. 10 is an exemplary sectional view of a mother glass having an inorganic alignment layer formed thereon according to an embodiment of the present invention.

FIG. 10 is a sectional view of a mother glass having an inorganic alignment layer formed thereon in accordance with an embodiment of the present invention.

Referring to FIG. 10, inorganic alignment layers 11 are formed on a mother glass 30 with a plurality of active areas. The inorganic alignment layers 11 have rounded edges 11a and 11b. When the inorganic alignment layer of a conventional technique is deposited and etched, the edges of the inorganic alignment layer are steep. However, because the inorganic alignment layers 11 are independently deposited in each active area by using atmospheric pressure plasma, the edges of the inorganic alignment layers are formed to be rounded.

The mother glass for the lower panel is described above with respect to FIGS. 3 and 7. However, an inorganic alignment layer may be alternately formed on a mother glass for an upper panel, which has a plurality of color filters and a common electrode without data pad areas and gate pads, by using substantially the same apparatus and manufacturing method.

Next, a liquid crystal display according to an embodiment of the present invention is described.

Figure 11:
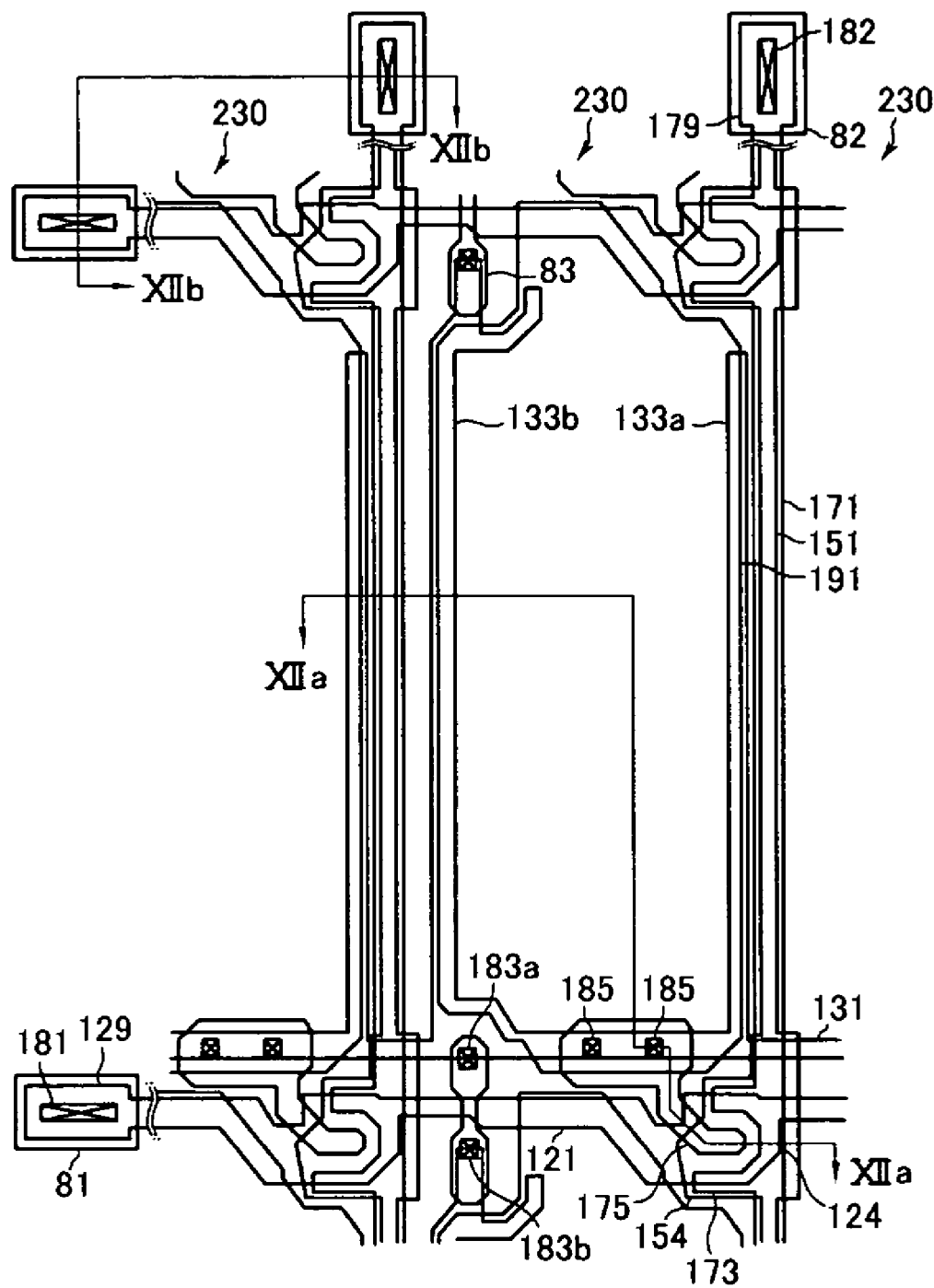
FIG. 11 is layout view of a liquid crystal display according to an embodiment of the present invention.
Figure 12A:
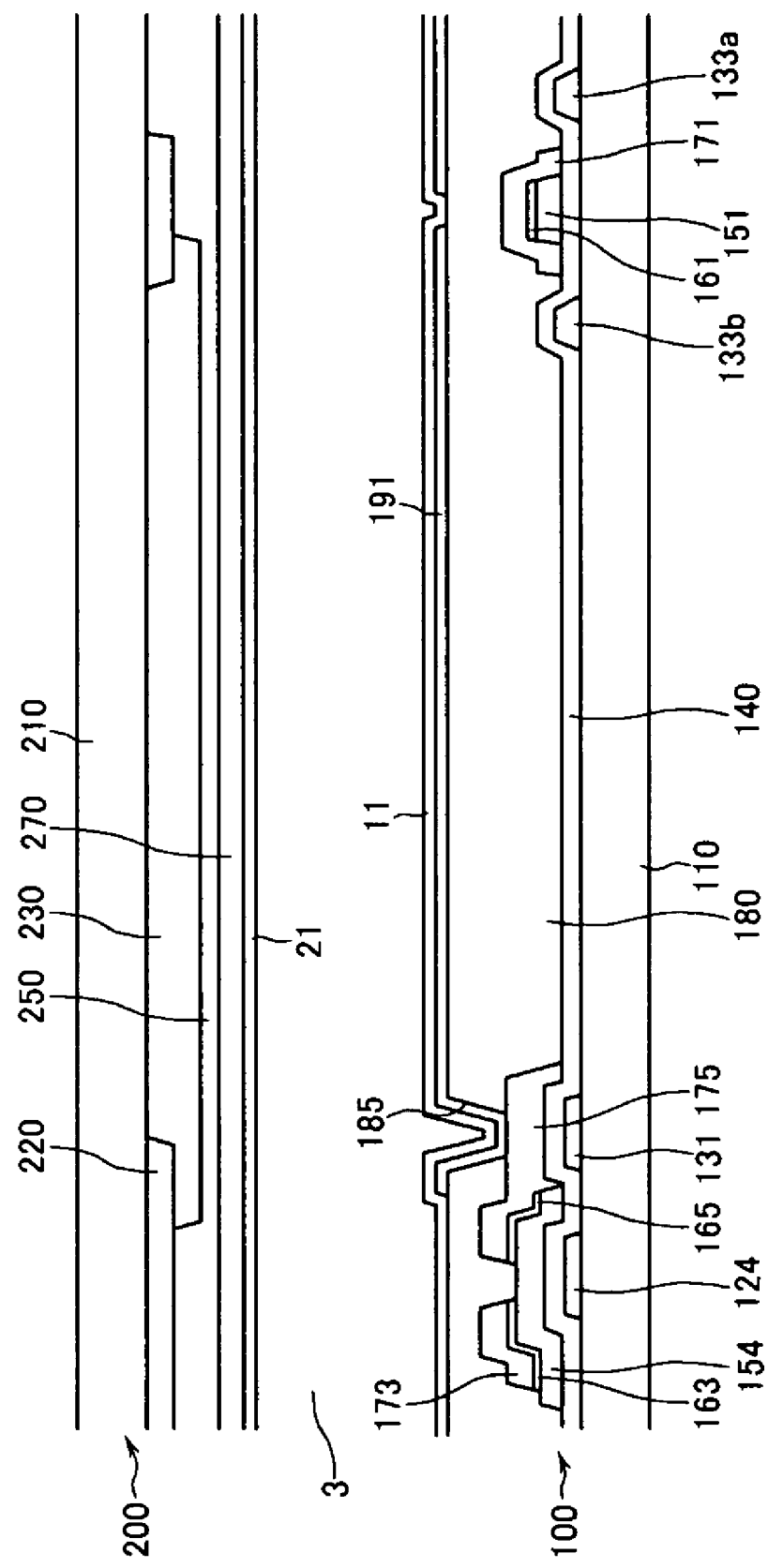
FIGS. 12A and 12B are sectional views of the LCD shown in FIG. 11, taken along the lines XIIa-XIIa and XIIb-XIIb.
Figure 12B:
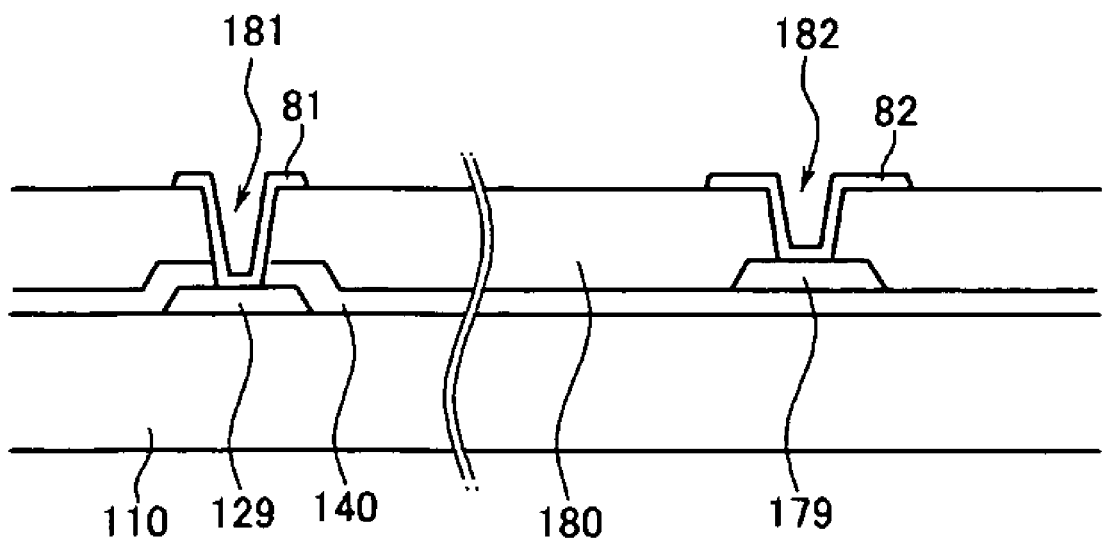

Referring to FIGS. 11 to 12B, a liquid crystal display according to an embodiment of the present invention includes a lower panel 100, an upper panel 200 facing the lower panel 100, and a liquid crystal layer 3 formed between the upper and lower panels 100 and 200.

First, the lower panel 100 according to an embodiment of the present invention will be described in detail.

A plurality of gate lines 121 and a plurality of storage electrode lines 131 are formed on an insulating substrate 110 made of a material such as transparent glass or plastic.

The gate lines 121 transmit gate signals and extend substantially in a transverse direction. Each of the gate lines 121 includes a plurality of gate electrodes 124 projecting downward and an end portion 129 having a large area for contact with another layer or an external driving circuit. A gate driving circuit (not shown) for generating the gate signals may be mounted on a flexible printed circuit (FPC) film (not shown), which may be attached to the substrate 110, directly mounted on the substrate 110, or integrated onto the substrate 110. The gate lines 121 may extend to be connected to a driving circuit that may be integrated on the substrate 110.

The storage electrode lines 131 are supplied with a predetermined voltage, and each of the storage electrode lines 131 includes a stem extending substantially parallel to the gate lines 121 and a plurality of pairs of storage electrodes 133a and 133b branched from the stems. Each of the storage electrode lines 131 is disposed between two adjacent gate lines 121, and a stem is close to one of the two adjacent gate lines 121. Each of the storage electrodes 133a and 133b has a fixed end portion connected to the stem and a free end portion disposed opposite thereto. The fixed end portion of the storage electrode 133b has a large area, and the free end portion thereof is bifurcated into a linear branch and a curved branch. However, the storage electrode lines 131 may have various shapes and arrangements.

The gate lines 121 and the storage electrode lines 131 are preferably made of an Al-containing metal such as Al or an Al alloy, a Ag-containing metal such as Ag or a Ag alloy, a Cu-containing metal such as Cu or a Cu alloy, a Mo-containing metal such as Mo or a Mo alloy, Cr or a Cr alloy, Ta or a Ta alloy, or Ti or a Ti alloy. It is noted that gate lines 121 and storage electrode lines 131 may have a multi-layered structure including two conductive films (not shown) having different physical characteristics. One of the two films is preferably made of a low resistivity metal such as an Al-containing metal, a Ag-containing metal, or a Cu-containing metal for reducing signal delay or voltage drop. The other film is preferably made of a material such as a Mo-containing metal, a Cr-containing metal, a Ta-containing metal, or a Ti-containing metal, which have good physical, chemical, and electrical contact characteristics with other materials such as indium tin oxide (ITO) or indium zinc oxide (IZO). Examples of the combination of the two films are a lower Cr film and an upper Al (alloy) film, and a lower Al (alloy) film and an upper Mo (alloy) film. However, the gate lines 121 and the storage electrode lines 131 may be made of various metals or conductors.

The lateral sides of the gate lines 121 and the storage electrode lines 131 are inclined relative to a surface of the substrate 110, and the inclination angle thereof ranges between about 30-80 degrees.

A gate insulating layer 140 preferably made of silicon nitride (SiNx) or silicon oxide (SiOx) is formed on the gate lines 121, the storage electrode lines 131, and the first test lines 21.

A plurality of semiconductor stripes 151 preferably made of hydrogenated amorphous silicon (abbreviated "a-Si") or polysilicon are formed on the gate insulating layer 140. The semiconductor stripes 151 extend substantially in the longitudinal direction and become relatively wider near the gate lines 121 and the storage electrode lines 131 such that the semiconductor stripes 151 cover large areas of the gate lines 121 and the storage electrode lines 131. Each of the semiconductor stripes 151 includes a plurality of projections 154 branched out toward the gate electrodes 124.

A plurality of ohmic contact stripes and islands 161 and 165 are formed on the semiconductor stripes 151. The ohmic contact stripes and islands 161 and 165 are preferably made of n+hydrogenated a-Si heavily doped with an N-type impurity such as phosphorous, or they may be made of silicide. Each ohmic contact stripe 161 includes a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to the surface of the substrate 110, and the inclination angles thereof are preferably in a range of about 30-80 degrees.

A plurality of data lines 171 and a plurality of drain electrodes 175 are formed on the ohmic contacts 161 and 165 and the gate insulating layer 140.

The data lines 171 transmit data signals and extend substantially in the longitudinal direction to intersect the gate lines 121. Each data line 171 also intersects the storage electrode lines 131 and runs between adjacent pairs of storage electrodes 133a and 133b. Each data line 171 includes a plurality of source electrodes 173 projecting toward the gate electrodes 124 and being curved like a crescent, and an end portion 179 having a large area for contact with another layer or an external driving circuit. A data driving circuit (not shown) for generating the data signals may be mounted on an FPC film (not shown), which may be attached to the substrate 110, directly mounted on the substrate 110, or integrated onto the substrate 110. The data lines 171 may extend to be connected to a driving circuit that may be integrated on the substrate 110.

The drain electrodes 175 are separated from the data lines 171 and disposed opposite the source electrodes 173 with respect to the gate electrodes 124. Each of the drain electrodes 175 includes a wide end portion and a narrow end portion.

The wide end portion overlaps a storage electrode line 131 and the narrow end portion is partly enclosed by a source electrode 173 with a "J" shape.

A gate electrode 124, a source electrode 173, and a drain electrode 175 along with a projection 154 of a semiconductor stripe 151 form a TFT having a channel formed in the projection 154 disposed between the source electrode 173 and the drain electrode 175.

The data lines 171 and the drain electrodes 175 are preferably made of a refractory metal such as Cr, Mo, Ta, Ti, or alloys thereof. However, they may have a multilayered structure including a refractory metal film (not shown) and a low resistivity film (not shown). Examples of the multi-layered structure are a double-layered structure including a lower Cr/Mo (alloy) film and an upper Al (alloy) film and a triple-layered structure of a lower Mo (alloy) film, an intermediate Al (alloy) film, and an upper Mo (alloy) film. However, the data conductors 171 and 175 may be made of various metals or conductors.

The data lines 171 and the drain electrodes 175 have inclined edge profiles, and the inclination angles thereof range between about 30-80 degrees.

The ohmic contacts 161 and 165 are interposed only between the underlying semiconductor stripes 151 and the overlying conductors 171 and 175 thereon, and reduce the contact resistance therebetween. Although the semiconductor stripes 151 are narrower than the data lines 171 at most places, the width of the semiconductor stripes 151 becomes relatively larger near the gate lines 121 and the storage electrode lines 131 as described above, to smooth the profile of the surface, thereby preventing disconnection of the data lines 171. The semiconductor stripes 151 have almost the same planar shapes as the data lines 171 and the drain electrodes 175 as well as the underlying ohmic contacts 161 and 165. However, the semiconductor stripes 151 include some exposed portions, which are not covered with the data lines 171 and the drain electrodes 175, such as portions located between the source electrodes 173 and the drain electrodes 175.

A passivation layer 180 is formed on the data lines 171, the drain electrodes 175, and the exposed portions of the semiconductor stripes 151. The passivation layer 180 is preferably made of an inorganic or organic insulator, and it may have a flat top surface. Examples of the inorganic insulator include silicon nitride and silicon oxide. The organic insulator may have photosensitivity and a dielectric constant of less than about 4.0. The passivation layer 180 may include a lower film of an inorganic insulator and an upper film of an organic insulator such that it takes the excellent insulating characteristics of the organic insulator while preventing the exposed portions of the semiconductor stripes 151 from being damaged with the organic insulator.

The passivation layer 180 has a plurality of contact holes 182 and 185 exposing the end portions 179 of the data lines 171 and the drain electrodes 175, respectively. The passivation layer 180 and the gate insulating layer 140 have a plurality of contact holes 181 exposing the end portions 129 of the gate lines 121, a plurality of contact holes 183a exposing portions of the storage electrode lines 131 near the fixed end portions of the storage electrodes 133b, and a plurality of contact holes 183b exposing the linear branches of the free end portions of the storage electrodes 133b.

A plurality of pixel electrodes 191, a plurality of overpasses 83, and a plurality of contact assistants 81 and 82 are formed on the passivation layer 180. They are preferably made of a transparent conductor such as ITO or IZO, or a reflective conductor such as Ag, Al, Cr, or alloys thereof.

The pixel electrodes 191 are physically and electrically connected to the drain electrodes 175 through the contact holes 185 such that the pixel electrodes 191 receive data voltages from the drain electrodes 175. The pixel electrodes 191 supplied with the data voltages generate electric fields in cooperation with a common electrode 270 of the opposing color filter panel 200 supplied with a common voltage, which determine the orientations of liquid crystal molecules (not shown) of a liquid crystal layer 3 disposed between the two panels 100 and 200. A pixel electrode 191 and the common electrode 270 form a capacitor referred to as a "liquid crystal capacitor," which stores applied voltages after the TFT turns off.

A pixel electrode 191 overlaps a storage electrode line 131 including storage electrodes 133a and 133b. The pixel electrode 191 and a drain electrode 175 connected thereto and the storage electrode line 131 form an additional capacitor referred to as a "storage capacitor," which enhances the voltage storing capacity of the liquid crystal capacitor.

The overpasses 83 cross over the gate lines 121 and they are connected to the exposed portions of the storage electrode lines 131 and the exposed linear branches of the free end portions of the storage electrodes 133b through the contact holes 183a and 183b, respectively, which are disposed opposite each other with respect to the gate lines 121. The storage electrode lines 131 including the storage electrodes 133a and 133b along with the overpasses 83 can be used for repairing defects in the gate lines 121, the data lines 171, or the TFTs.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and enhance the adhesion between the end portions 129 and 179 and external devices.

A description of the color filter panel 200 follows.

A light blocking member 220 referred to as a black matrix for preventing light leakage is formed on an insulating substrate 210 made of a material such as transparent glass or plastic. The light blocking member 220 may have a plurality of openings that face the pixel electrodes 191, and it may have substantially the same planar shape as the pixel electrodes 191.

A plurality of color filters 230 are also formed on the substrate 210, and they are disposed substantially in the areas enclosed by the light blocking member 220. The color filters 230 may extend substantially in the longitudinal direction along the pixel electrodes 191. The color filters 230 may represent one of the primary colors such as red, green, and blue colors.

An overcoat 250 is formed on the color filters 230 and the light blocking member 220. The overcoat 250 is preferably made of an (organic) insulator, and it prevents the color filters 230 from being exposed and provides a flat surface. The overcoat 250 may be omitted.

A common electrode 270 is formed on the overcoat 250. The common electrode 270 is preferably made of a transparent conductive material such as ITO and IZO.

Inorganic alignment layers 11 and 21 are coated on inner surfaces of the panels 100 and 200, and polarizers (not shown) are provided on outer surfaces of the panels 100 and 200 so that their polarization axes may cross, and one of the polarization axes may be parallel to the gate lines 121.

As described above, the present invention using atmospheric pressure plasma to form the inorganic alignment layer is more simplified than previous processes with the omission of the etch steps of the short point area and the pad areas. Advantageously, alignment layers may be formed on the mother glass with various shapes by using one apparatus.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for manufacturing a liquid crystal display, the method comprising:
    forming a field-generating electrode on at least one of a first panel and a second panel;
    forming an inorganic alignment layer on the field-generating electrode by using atmospheric pressure plasma, and
    forming a liquid crystal layer between the first panel and the second panel.

2. The method of claim 1, wherein the inorganic alignment layer is formed only on an active area of the first panel.

3. The method of claim 1, wherein plasma-generating electrodes are moved over at least one of the first panel and the second panel to form the inorganic alignment layer.

4. The method of claim 1, further comprising:
    pre-cleaning a portion of at least one of the first panel and the second panel for depositing the inorganic alignment layer by using atmospheric pressure plasma before forming the inorganic alignment layer.

5. The method of claim 4, wherein the pre-cleaning process uses at least one gas selected from oxygen ($O_2$), helium (He), and air.

6. The method of claim 1, further comprising:
    post-cleaning the surface of the inorganic alignment layer by using atmospheric pressure plasma after forming the inorganic alignment layer.

7. The method of claim 6, wherein the post-cleaning process uses at least one gas selected from oxygen ($O_2$), helium (He), and air.

8. The method of claim 1, wherein an ion beam treatment is executed on surfaces of the inorganic alignment layer after forming the inorganic alignment layer.

9. The method of claim 1, wherein the inorganic alignment layer includes at least one material selected from amorphous silicon (a-Si), silicon carbide (SiC), silicon nitride (SiN), silicon oxide ($SiO_x$), and fluorinated diamond-like carbon.

10. The method of claim 9, wherein the inorganic alignment layer includes amorphous silicon (a-Si),
    wherein the amorphous silicon (a-Si) is formed using silane ($SiH_4$), hydrogen ($H_2$), or helium (He).

11. The method of claim 9, wherein the inorganic alignment layer includes silicon carbide (SiC),
    wherein the silicon carbide (SiC) is formed using silane ($SiH_4$), methane ($CH_4$), hydrogen ($H_2$), or helium (He).

12. The method of claim 9, wherein the inorganic alignment layer includes silicon nitride (SiN),
    wherein the silicon nitride (SiN) is formed using silane ($SiH_4$), ammonia ($NH_4$), hydrogen ($H_2$), or helium (He).

13. The method of claim 9, wherein the inorganic alignment layer includes silicon oxide ($SiO_x$),
    wherein the silicon oxide ($SiO_x$) is formed using silane ($SiH_4$), oxygen ($O_2$), or helium (He).

14. The method of claim 9, wherein the inorganic alignment layer includes fluorinated diamond-like carbon,
    wherein the fluorinated diamond-like carbon is formed using acetylene ($C_2H_2$), a fluorine-containing gas such as carbon tetrafluoride ($CF_4$) and sulfur hexafluoride ($SF_6$), or helium (He).

15. The method of claim 1, further comprising forming a light source outside the first panel.

* * * * *